(12) United States Patent
Tuma

(10) Patent No.: US 8,864,884 B2
(45) Date of Patent: *Oct. 21, 2014

(54) CONTAMINANT CONTROL FILTER WITH FILL PORT

(75) Inventor: Daniel L. Tuma, Chonburi (TH)

(73) Assignee: Donaldson Company, Inc., Minneapolis, MN (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/269,160

(22) Filed: Oct. 7, 2011

(65) Prior Publication Data

US 2012/0118158 A1    May 17, 2012

Related U.S. Application Data

(63) Continuation of application No. 12/172,244, filed on Jul. 13, 2008, now Pat. No. 8,033,304.

(60) Provisional application No. 60/949,840, filed on Jul. 13, 2007.

(51) Int. Cl.
| | | |
|---|---|---|
| *B01D 53/04* | (2006.01) | |
| *B01D 46/10* | (2006.01) | |
| *B01D 46/30* | (2006.01) | |
| *B01D 46/00* | (2006.01) | |

(52) U.S. Cl.
CPC ........ *B01D 46/0001* (2013.01); *B01D 2279/45* (2013.01); *B01D 46/30* (2013.01); *B01D 46/0036* (2013.01); *B01D 46/0028* (2013.01); *Y10S 55/05* (2013.01)
USPC ............ 96/138; 96/151; 55/385.6; 55/DIG. 5

(58) Field of Classification Search
USPC ........ 96/4, 134, 135, 138, 151; 95/43, 54, 90, 95/273, 274; 55/385.6, 512, DIG. 5; 141/8; 366/97.12–97.18
See application file for complete search history.

(56) References Cited

U.S. PATENT DOCUMENTS

| 3,972,451 A | 8/1976 | Parish et al. |
| 4,209,401 A | 6/1980 | Henton |

(Continued)

FOREIGN PATENT DOCUMENTS

| CN | 1452772 | 10/2003 |
| EP | 1421266 | 8/2008 |

(Continued)

OTHER PUBLICATIONS

Machine generated English translation of JP 2006-219138 A, published Aug. 2006.*

(Continued)

*Primary Examiner* — Frank Lawrence
(74) *Attorney, Agent, or Firm* — Pauly, Devries Smith & Deffner, LLC

(57) ABSTRACT

Filters, methods, and an apparatus for filling housings and both encapsulated porous and non-porous spaces with contaminant control media for placement in electronic enclosures, such as disk drive enclosures, are disclosed. In one embodiment, a filter assembly includes a housing comprising an internal cavity configured to receive contaminant control media, a fill port in communication with the internal cavity, and an opening in communication with the internal cavity, and filter media at least partially covering the opening; and contaminant control media occupying the internal cavity. Contaminant control media is deposited within the internal cavity via the fill port by means of creating a negative pressure within the internal cavity. The application of a partial vacuum facilitates movement of the contaminant control media into the internal cavity and minimizes the contamination of the filter, housing, and work space common to other loose fill filling methods.

20 Claims, 6 Drawing Sheets

(56) References Cited

U.S. PATENT DOCUMENTS

| | | | |
|---|---|---|---|
| 4,509,959 | A | 4/1985 | McCombs |
| 4,552,570 | A | 11/1985 | Gravatt |
| 4,617,122 | A | 10/1986 | Kruse et al. |
| 4,684,510 | A | 8/1987 | Harkins |
| 4,699,681 | A | 10/1987 | Kasmark et al. |
| 4,863,499 | A | 9/1989 | Osendorf |
| 5,030,260 | A | 7/1991 | Beck et al. |
| 5,367,417 | A | 11/1994 | Brown et al. |
| 5,391,426 | A | 2/1995 | Wu |
| 5,417,743 | A | 5/1995 | Dauber |
| 5,500,038 | A | 3/1996 | Dauber et al. |
| 5,538,545 | A | 7/1996 | Dauber et al. |
| 5,593,482 | A | 1/1997 | Dauber et al. |
| 5,816,438 | A | 10/1998 | Berger |
| 5,869,009 | A | 2/1999 | Bellefeuille et al. |
| 5,876,487 | A | 3/1999 | Dahlgren et al. |
| 5,916,671 | A | 6/1999 | Dauber et al. |
| 5,980,616 | A | 11/1999 | Johnson et al. |
| 5,997,614 | A | 12/1999 | Tuma et al. |
| 5,997,618 | A | 12/1999 | Schneider et al. |
| 6,077,335 | A | 6/2000 | Schneider et al. |
| 6,143,058 | A | 11/2000 | Dahlgren et al. |
| 6,143,675 | A | 11/2000 | McCollam et al. |
| 6,146,446 | A | 11/2000 | Tuma et al. |
| 6,168,651 | B1 | 1/2001 | Tuma et al. |
| 6,168,681 | B1 | 1/2001 | Bellefeuille et al. |
| 6,196,708 | B1 | 3/2001 | Rogers |
| 6,214,070 | B1 | 4/2001 | Crowder et al. |
| 6,214,095 | B1 | 4/2001 | Logan et al. |
| 6,238,467 | B1 | 5/2001 | Azarian et al. |
| 6,267,939 | B1 | 7/2001 | Gemes et al. |
| 6,270,609 | B1 | 8/2001 | Markell et al. |
| 6,296,691 | B1 | 10/2001 | Gidumal |
| 6,395,073 | B1 | 5/2002 | Dauber et al. |
| 6,446,750 | B1 | 9/2002 | Lewin |
| 6,475,270 | B1 | 11/2002 | Graeve |
| 6,491,741 | B2 | 12/2002 | Tuma et al. |
| 6,582,113 | B2 | 6/2003 | Rogers |
| 6,706,092 | B2 | 3/2004 | Rohrbach et al. |
| 6,709,498 | B2 | 3/2004 | Tuma |
| 6,726,745 | B2 | 4/2004 | Tuma et al. |
| 6,878,283 | B2 | 4/2005 | Thompson |
| 6,890,373 | B2 | 5/2005 | Nemoto et al. |
| 6,926,761 | B2 | 8/2005 | Johnson et al. |
| 6,936,093 | B2 | 8/2005 | Isogawa et al. |
| 7,115,159 | B2 | 10/2006 | Fujita et al. |
| 7,115,160 | B2 | 10/2006 | Fitch et al. |
| 7,132,011 | B2 | 11/2006 | Shellhammer et al. |
| 7,160,369 | B2 | 1/2007 | Blücher et al. |
| 7,166,142 | B2 | 1/2007 | Tuma et al. |
| 8,033,304 | B2 | 10/2011 | Tuma |
| 2002/0063990 | A1 | 5/2002 | Hirasaka et al. |
| 2003/0047078 | A1 | 3/2003 | Ueki et al. |
| 2003/0056653 | A1 | 3/2003 | Ueki et al. |
| 2003/0151847 | A1 | 8/2003 | Tsang et al. |
| 2004/0114273 | A1 | 6/2004 | Fujiwara et al. |
| 2005/0047001 | A1 | 3/2005 | Logan |
| 2005/0063093 | A1 | 3/2005 | Hong et al. |
| 2005/0166558 | A1 | 8/2005 | Johnson |
| 2009/0145298 | A1 | 6/2009 | Welch |

FOREIGN PATENT DOCUMENTS

| | | |
|---|---|---|
| JP | 64-032301 | 2/1989 |
| JP | 04-250813 | 9/1992 |
| JP | 06-007624 | 1/1994 |
| JP | 08-089741 | 4/1996 |
| JP | 11-104429 | 4/1999 |
| JP | 2006007624 | 1/2006 |
| JP | 2006219138 | 8/2006 |

OTHER PUBLICATIONS

Non-Final Office Action from CN Application No. 200880024530.2 mailed Jun. 5, 2013, 5 pages.

Second Office Action Received, for Chinese Application No. 200880024530.2, mailed Sep. 26, 2012 corresponding to U.S. Appl. No. 13/269,160—English translation, 5 pages.

PCT International Search Report and Written Opinion for International Application No. PCT/US2008/069902, mailed Feb. 17, 2009, 10 pages.

First Office Action Received, for Chinese Application No. 200880024530.2, corresponding to U.S. Appl. No. 60/949,840, mailed Nov. 28, 2011, including English translation, 10 pages.

\* cited by examiner

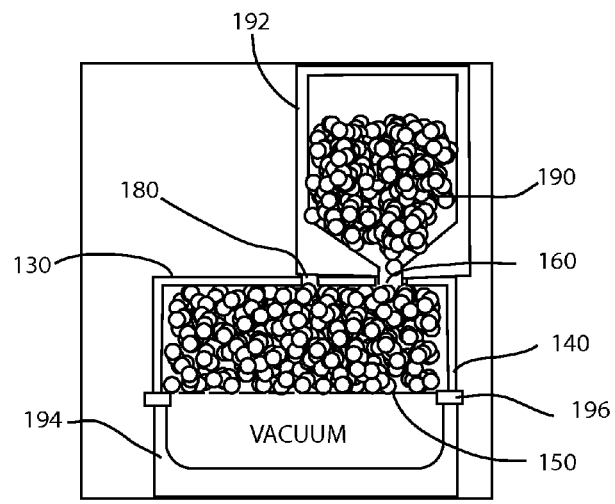
FIG. 10
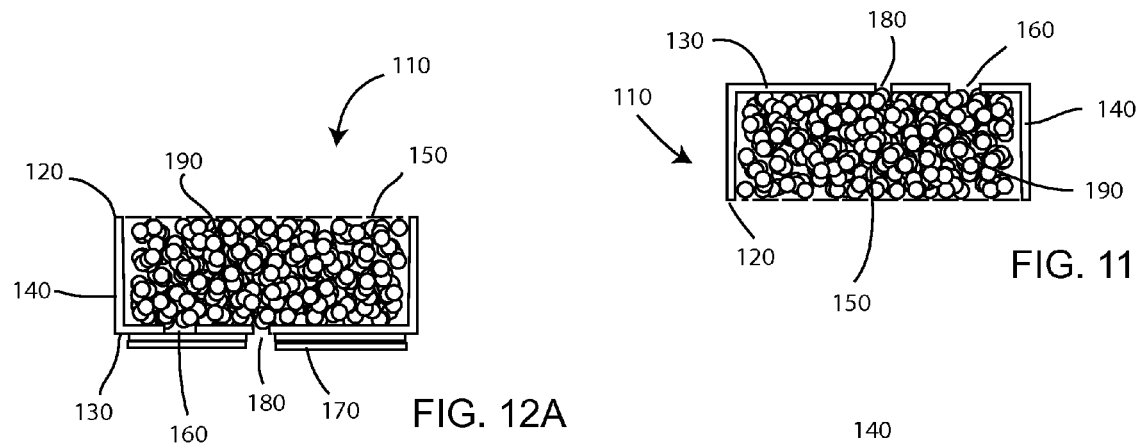
FIG. 12A
FIG. 11
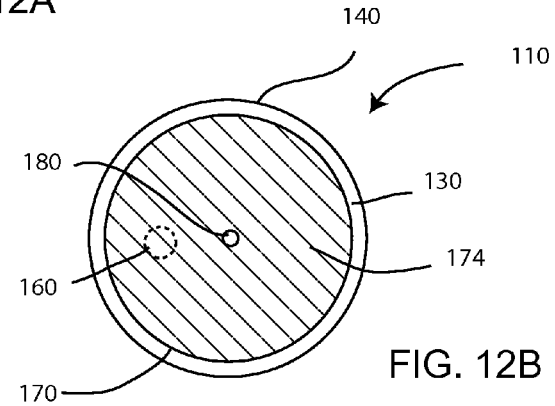
FIG. 12B

CONTAMINANT CONTROL FILTER WITH FILL PORT

PRIORITY

This application is a continuation of U.S. patent application Ser. No. 12/172,244, filed Jul. 13, 2008, issued on Oct. 11, 2011 as U.S. Pat. No. 8,033,304, which claims the benefit of U.S. Provisional Patent Application Ser. No. 60/949,840, entitled "CONTAMINANT CONTROL FILTER WITH FILL PORT," filed Jul. 13, 2007, the contents of which are herein incorporated by reference.

TECHNICAL FIELD

The present invention relates to a filter construction, an apparatus for making the filter construction, and methods for making the filter construction.

BACKGROUND OF THE INVENTION

Contaminant control and recirculation filters have a variety of uses, including uses in electronic equipment. In the computer industry, contaminant control and recirculation filters are used within enclosures for electronic devices to protect the electronic components from particulate and gaseous contaminants. For example, disk drives often include contaminant control and recirculation filters within the disk drive enclosure to protect the drive components and the disks from contaminants including water vapor, organic vapor, and outgassing. Without such protection, these contaminants can lead to stiction, corrosion, and, in some instances, drive failure.

Frequently, contaminant control and recirculation filters have either a loose fill contaminant control (see U.S. Pat. No. 6,077,335) or a compression molded contaminant control of various configurations (see, e.g., U.S. Pat. No. 5,876,487 or No. 6,146,446). Each of these configurations offers distinct advantages and disadvantages. A loose fill contaminant control media is generally less expensive than one that is compression molded. However, loose fill contaminant control media is difficult to manipulate due to its granular or beaded nature, and can cause contamination of the clean room, the filter housing, and the surfaces that require welding after deposition of the loose fill contaminant control media. Compression molded contaminant controls are generally easier to handle and are cleaner to use in a clean room environment. However, they are more expensive, require tooling that adds to cost and labor time, and are much less efficient in contaminant adsorption. Clearly, a new filter design which overcomes these challenges would be desirable.

SUMMARY OF THE INVENTION

Generally, the present invention relates to adsorbent or recirculation filters for placement in an electronic enclosure, such as a hard disk drive, methods of filling these filters with a contaminant control media, and an apparatus capable of accomplishing the filling.

In an embodiment, the invention includes a method for filling a filter assembly with a contaminant control media comprising the steps of: providing a housing containing an internal cavity, at least one fill port formed in the housing and in communication with the internal cavity of the housing, and an opening with filter media at least partially covering the opening; providing contaminant control media; creating a negative pressure with the internal cavity by drawing a partial vacuum within the cavity; and drawing the contaminant control media into the internal cavity under partial vacuum. In addition to drawing in the adsorbent, the partial vacuum also prevents dust created during handling the adsorbent or filling the cavity from escaping and contaminating the manufacturing room. The filter media can comprise ePTFE, the contaminant control media can comprise an adsorbent material and neutralization material, and the filter assembly can be configured for insertion into an electronic enclosure.

In an embodiment, the invention includes a method for filling a porous filter assembly with a contaminant control media, comprising the steps of: providing a porous container at least partially formed of filter media; providing the contaminant control media; drawing a partial vacuum across the porous container; and drawing the contaminant control media into the porous container under partial vacuum. The filter media can comprise ePTFE and the contaminant control media can comprise an adsorbent material and neutralization material. The porous container can comprise a filter bag or a molded housing and the filter assembly can be configured for insertion into an electronic enclosure.

In an embodiment, the invention includes a filter assembly for use in an electronic enclosure including a housing comprising: an internal cavity within the housing, the internal cavity configured to receive contaminant control media, at least one fill port in communication with the internal cavity, an opening in communication with the cavity, and filter media at least partially covering the opening. Contaminant control media occupies the internal cavity. The filter media can comprise ePTFE and the contaminant control media can comprise an adsorbent material and neutralization material. The filter assembly can be configured for insertion into an electronic enclosure.

In an embodiment, the invention includes a delivery apparatus comprising: a holding unit configured to retain contaminant control media; an assembly configured to deposit contaminant control media into an encapsulated space; and a device capable of creating a negative pressure within the encapsulated space to facilitate movement of the contaminant control media into the encapsulated space and to prevent the escape of any dust (aerosol) created during the filling.

This summary of the present invention is merely an overview of some of the teachings of the present application and is not intended to describe each disclosed embodiment or every implementation of the present invention. Further embodiments will be found in the figures, detailed description, and claims. The scope of the present invention should be determined by the appended claims and their legal equivalents.

BRIEF DESCRIPTION OF THE DRAWINGS

The invention may be more completely understood in connection with the following drawings, in which:

FIG. 10 shows the apparatus for loading contaminant control media of FIG. 7 along with the housing for a filter assembly of FIG. 6, wherein the housing is filled with contaminant control media.

FIG. 11 shows the housing for a filter assembly of FIGS. 6 to 10, after the housing has been removed from the apparatus for loading contaminant control media.

FIG. 12A shows the housing for a filter assembly of FIGS. 6 to 11, after a mounting label with release liner has been added and the fill hole in the housing has been closed.

FIG. 12B shows a bottom plan view of the filter assembly of FIG. 12A.

Figure 1:
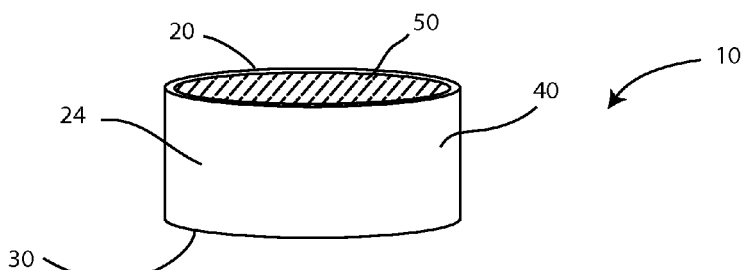
FIG. 1 is a perspective view of one embodiment of a filter assembly, according to the invention.

While the invention is susceptible to various modifications and alternative forms, specifics thereof have been shown by way of example and drawings, and will be described in detail.

It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is applicable to filters and methods of making and using filters to filter a fluid, such as, for example, air or other gases. The filter construction can reduce contaminants within an electronic enclosure, such as a disk drive housing, by a variety of processes. One process for reducing, removing, or preventing contamination within the disk drive housing is to reduce or remove contaminants entering the disk drive housing from regions outside of the disk drive housing (or other device). The breather embodiment of the filter construction is constructed for this purpose. A second process for reducing, removing or preventing contamination from within the disk drive housing is to reduce or remove contaminants present in the disk drive housing atmosphere. The recirculation embodiment of the filter construction, can be constructed for this purpose. In addition, an adsorbent assembly can be used to remove contaminants from the inside of a drive. The adsorbent assembly contains contaminant control media, and is placed within the electronic enclosure, but does not have a recirculation function and does not communicate by a breather hole with the exterior of the enclosure. However, the adsorbent assembly still removes contaminants from the drive interior.

In one embodiment, the invention includes a method for filling a filter assembly with a contaminant control media under partial vacuum in a fashion such that the filter assembly is filled with minimal external contamination. In such embodiments the method comprises the steps of providing a housing containing an internal cavity, at least one fill port in communication with the internal cavity, and an opening with filter media at least partially covering said opening. An air flow through the fill hole is created by applying a partial vacuum to the outside of the porous media and this air flow helps draw in the contaminant control media and prevents dust from escaping through the fill hole. The filter media can comprise ePTFE, the contaminant control media can comprise an adsorbent material and neutralization material, and the filter assembly can be configured for insertion into an electronic enclosure.

The filter construction generally includes a particulate or solid removal element and a contaminant control element. Examples of particulate or solid removal elements include, but are not limited to, filter materials such as polymers, non-woven materials, fibers, paper, and the like. Examples of contaminant control elements include, but are not limited to, adsorbent material, neutralization material, and the like. Additionally or alternatively, a tortuous or extended path, such as a diffusion channel, can be used to restrict contaminant entry into the electronic enclosure when the filter construction is used as a breather filter.

Figure 2:
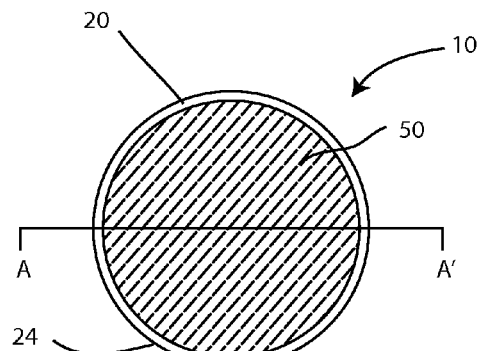
FIG. 2 is a top plan view of the filter assembly of FIG. 1.

Various aspects of the invention will now be discussed in reference to the figures. Referring to FIGS. 1 and 2, one embodiment of the invention includes a filter assembly 10 comprising a housing 40 having a top 20, base 30, sidewall 24, and filter media 50 secured to the top 20. Although FIGS. 1 and 2 depict the housing 40 as generally cylindrical in shape, it will be appreciated that various embodiments can include multiple sidewalls defining various shape and sizes of the filter assembly 10. For example, the housing 40 can be rectangular, oval, square, circular, triangular, or generally any other shape desired.

In many applications the housing will be constructed such that it is customized for a specific electronic enclosure, so that it fits within an appropriate portion of the enclosure without interfering with other equipment within the enclosure. For example, when placed within a disk drive assembly, the filter assembly 10 having housing 40 must avoid contact with the spinning disks and read/write head of the disk drive, while also allowing adequate clearance with these moving parts to avoid creating undesirable air turbulence. One of the benefits of the present invention is that it allows a wide variety of shapes and sizes of filter assemblies 10 to be manufactured with minimal retooling for different assembly configurations.

Although FIGS. 1 and 2 depict the filter media 50 as generally a circular shape covering the majority of the top 20, it will be appreciated that the filter media 50 can be of any shape and can cover different sizes, areas, and dimensions (including one or more sidewall(s) and the base 30) of the filter assembly 10. It will be appreciated that the filter media 50 can be secured with a variety of methods including, but not limited to, mold casting, welding, adhesives, mechanical connections, and the like.

Figure 3:
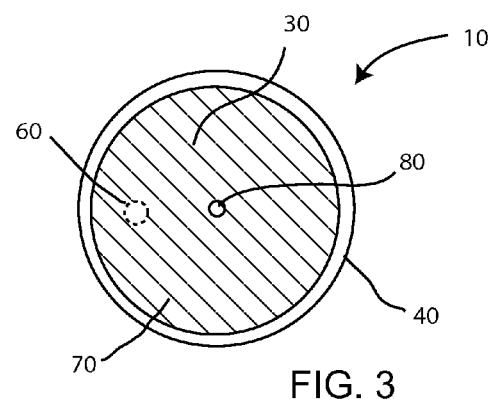
FIG. 3 is a bottom plan view of the filter assembly of FIG. 1.

FIG. 3 portrays a bottom plan view of the embodiment of the filter assembly shown in FIGS. 1 and 2. The base 30 of the filter assembly 10 defines a fill port 60 (indicated by phantom circle). The fill port 60 is used to fill the internal cavity of the housing 40 with contaminant control media 90 (shown in FIG. 5). After the internal cavity of the housing 40 is filled, the fill port 60 can be sealed. In one embodiment of the invention, the fill port 60 is sealed with an adhesive mounting label 70.

The mounting label 70, serves a dual purpose in the embodiment of the invention shown in FIGS. 1, 2, 3, 4, and 5. The mounting label 70 both seals the fill port 60 and holds the filter assembly 10 in the electronic enclosure. The mounting label 70 can be, for example, a double-sided adhesive film that includes an adhesive carrier with adhesive disposed on both sides. In such embodiments the mounting label 70 can both seal the fill port 60 during manufacture and later secure the filter assembly 10 to a mounting surface, such as the interior wall of a hard disk drive. The adhesive carrier is typically a polymer film, such as, for example, a polyethylene, polypropylene, polyester, polycarbonate, polyurethane, or polyvinyl chloride film. Suitable adhesives include, but are not limited to, epoxies, resins, pressure-sensitive adhesives, hot-melt adhesives, solvent-based adhesives, emulsion-based adhesives, and contact adhesives. One example of a suitable adhesive is 3M 502FL adhesive from 3M Co. (St. Paul, Minn.).

It will be appreciated that the fill port 60 can also be sealed with a variety of other methods including, but not limited to, snug fit plugs, filter media, ultrasonic welding, and the like. If a mounting label 70 is not used, an additional adhesive media may be necessary. Or, in the alternative, the filter assembly 10 can be held in the electronic enclosure by mechanical techniques, including, but not limited to, clips, frames, welding, or the like. Although FIG. 3 depicts the fill port 60 as generally a circular shape, it will be appreciated that the fill port 60 can be any shape.

Referring again to FIG. 3, in the depicted embodiment of the invention the base 30 of the filter assembly 10 defines a breather port 80. The breather port 80 permits the flow of fluid from the outside of the electronic enclosure into the electronic enclosure. The breather port 80 allows the flow of air to come into contact with the contaminant control media 90 disposed within the internal cavity of the filter housing 40 prior to the flow of air exiting the filter assembly 10. Although FIG. 3 depicts the breather port 80 as generally a circular shape, it will be appreciated that the breather port 80 can be of any shape. Also, although not depicted herein, the breather port can be connected to a diffusion channel, molded into the base 70, formed by one or more thin films, or formed within the surface on which the filter assembly 10 is ultimately mounted (such as the interior wall of a disk drive).

Figure 4:
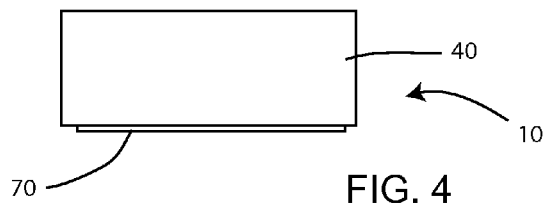
FIG. 4 is a side elevational view of the filter assembly of FIG. 1.

FIG. 4 portrays a schematic side view of the embodiment of the invention shown in FIGS. 1, 2, and 3. The mounting label 70 can be seen present on the base 30 of one embodiment of the invention.

Figure 5:
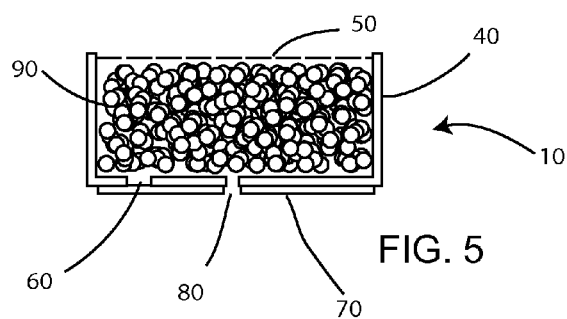
FIG. 5 is a schematic cross sectional view of the filter assembly along line A-A' of FIG. 2.

FIG. 5 portrays a cross-sectional view of the embodiment of the invention shown in FIGS. 1 to 4, with the cross section taken along line A-A' of FIG. 2. The filter media 50 is secured to the top 20. The base 30 of the housing 40 defines the fill port 60 that has been sealed by the mounting label 70, and the base 30 of the housing 40 in conjunction with the mounting label 70 helps further define the breather port 80. The housing 40 also defines the internal cavity within which the contaminant control media 90 is deposited via the fill port 60. It will be appreciated that the contaminant control media 90 is of sufficient size, shape, or composition that it is unable to escape through the breather port 60 in the embodiment depicted. Thus, for example, if the breather port is 2 mm in diameter, then it would be desirable to use contaminant control media that is 3 mm in diameter (or at least greater than 2 mm in diameter). In the alternative a scrim or other material can be placed over the interior or exterior of the breather port to prevent escape of the contaminant control media. Further detailed discussion of the contaminant control media can be found below.

Figure 6:
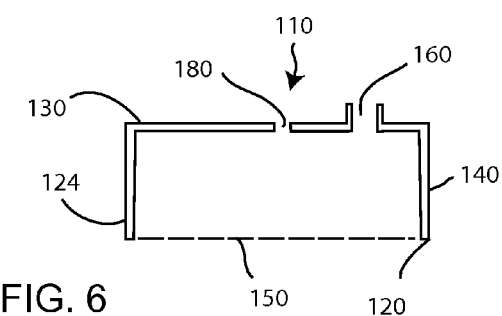
FIG. 6 is an inverted cross sectional view of the housing for a filter assembly, prior to being filled with contaminant control media.
Figure 7:
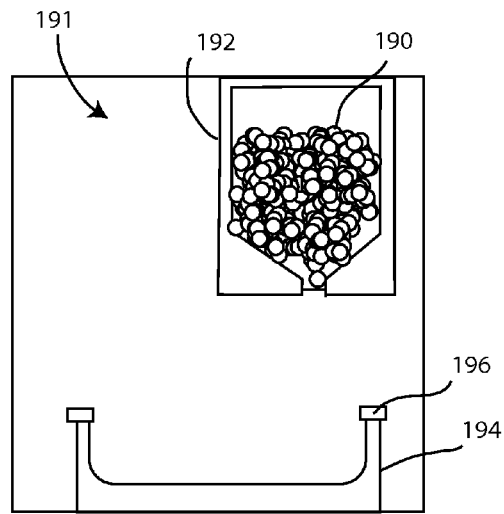
FIG. 7 is a schematic diagram of an apparatus for loading contaminant control media into a housing for a filter, the apparatus including a source for contaminant control media and a coupling device for applying a vacuum to a surface of the housing.

FIG. 6 portrays an inverted cross sectional view of one embodiment of the invention, prior to filling the housing with contaminant control media. The filter assembly 110 is defined by a housing 140 having a top 120, base 130, sidewall 124, and filter media 150 secured to the top 20. The base 130 of the housing 140 defines a fill port 160 and a breather port 180.

FIGS. 7-10 portray a schematic diagram, and mechanism of operation, of one embodiment of a filling apparatus capable of loading contaminant control media into the housing of a filter assembly. The filling apparatus 191 includes contaminant control media 190 placed within a loading unit 192. The filling apparatus 191 further comprises a loading station 194 where the housing 140 for the filter assembly 110 will be placed. The loading station 194 will also be capable of drawing a vacuum across a surface of the housing 140 containing filter media 150 and therefore will further comprise a vacuum generating apparatus. The loading station 194 will further contain a coupling device 196 for attaching the housing 140 to the loading station 194 and for facilitating the creation of a seal sufficient to draw a partial vacuum across a surface of the housing 140 containing filter media 150.

Figure 8:
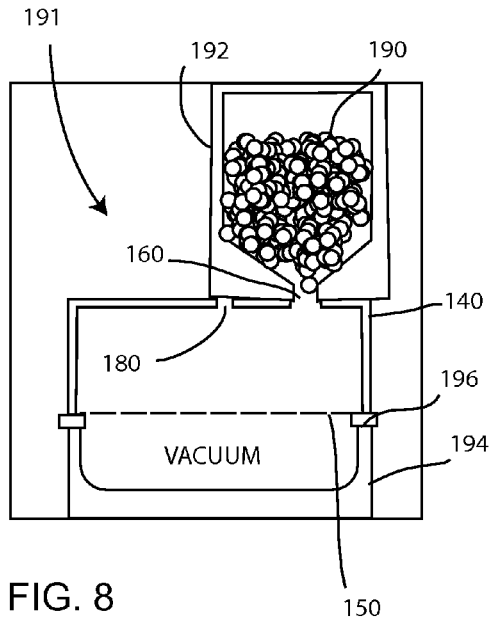
FIG. 8 shows the apparatus for loading contaminant control media of FIG. 7 along with the housing for a filter assembly of FIG. 6, wherein the housing is mounted on the apparatus for loading but before loading the housing with contaminant control media.

FIG. 8 portrays the filling apparatus 191 where the loading station 194 is occupied by a housing 140 for the filter assembly 110 found in FIG. 6. The loading unit 192 is engaged with the housing 140 at the fill port 160 on the base 130 and is capable of depositing the contaminant control media 190 into the internal cavity of the housing 140. To facilitate delivery of the contaminant control media 190, a partial vacuum will be drawn across the filter media 150; the vacuum generating apparatus being coupled to the loading station 194 and the seal for drawing the vacuum across filter media 150 being facilitated by the coupling device 196 located on the loading station 194. It will be appreciated that in this embodiment the breather port 180 must be sealed in order to generate the partial vacuum and in this embodiment, the loading unit 192 is capable of sealing the breather port 180. It will be appreciated that the breather port 180 can also be sealed with any other temporary mechanism, for example, a removable adhesive tape or label.

Figure 9:
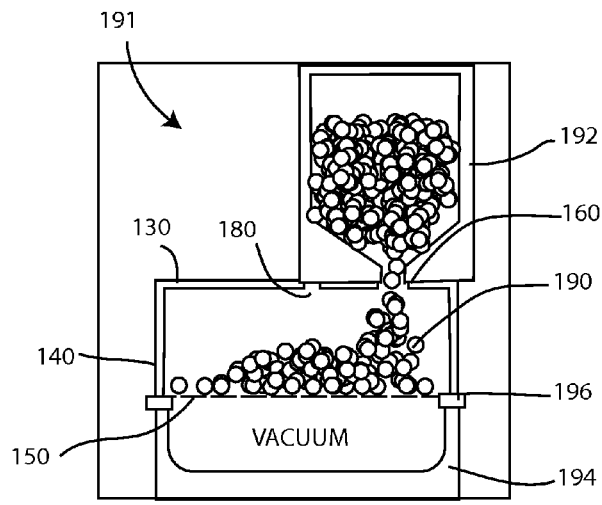
FIG. 9 shows the apparatus for loading contaminant control media of FIG. 7 along with the housing for a filter assembly of FIG. 6, wherein the housing is partially filled with contaminant control media.

FIG. 9 portrays the loading apparatus loading contaminant control media into the internal cavity of the filter assembly from FIG. 6; the task being partially completed. The application of a partial vacuum facilitates movement of the contaminant control media 190 from the loading unit 192, through the filler port 160 on the base 130 of the housing 140, and into the internal cavity of the housing 140 of the filter assembly 110. A seal sufficient to create a partial vacuum is created by 1) temporarily sealing the breather port 180 and 2) the coupling device 196 of loading unit 194 creating a seal across the filter media 150 of the housing 140.

FIG. 10 portrays the loading apparatus loading contaminant control media into the internal cavity of the filter assembly; the task being completed. The internal cavity of the housing 140 of the filter assembly 110 can be completely and efficiently filled with contaminant control media 190 because of the application of a partial vacuum across the filter media 150 of the housing 140 and the temporary sealing of the breather port 180.

It will be appreciated that FIGS. 7-10 only represent a single, simplified schematic of the filling apparatus 191 and that various embodiments of the filling apparatus will exist to fill various embodiments of the filter assembly. The general purpose of the filling apparatus is to provide a mechanism to fill the internal cavity of a filter housing with contaminant control media. The contaminant control media is drawn into the internal cavity of the filter housing by drawing a partial vacuum on at least a portion of one surface of the filter housing at least partially covered with secured filter media.

FIG. 11 portrays the housing for the filter assembly of FIGS. 6 to 10 in an inverted position, after the filter assembly has been removed from the loading apparatus. The internal cavity of the housing 140 of filter assembly 110 is completely occupied by the contaminant control media 190 that was loaded via the fill port 160. It will be appreciated that in this embodiment the contaminant control media 190 is of sufficient size, shape, or composition that is unable to escape the internal cavity of the housing 140 of the filter assembly 110 via the breather port 180.

FIG. 12A portrays the filter assembly 110 in an upright position after a mounting label has been attached to the base 130 of the housing 140. The mounting label 170 closes the fill port 160; thereby preventing the contaminant control media 190 from escaping the internal cavity of the housing 140. The mounting label 170 further defines the breather port 180 located on the base 130 of the housing 140 of the filter assembly 110. The mounting label 170 can be, for example, a double-sided adhesive film that includes an adhesive carrier with adhesive disposed on both sides. One adhesive surface can bind to the base 130 of the filter assembly 110 and the second adhesive surface can be protected by a release liner 174. The release liner 174 can be removed, thereby exposing a second adhesive surface that can be used to secure the filter assembly 110 to an internal surface of an electronic enclosure.

FIG. 12B portrays a bottom plan view of the filter assembly of FIG. 12A. The base 130 of the housing 140 of the filter assembly 110 defines the breather port 180 and the fill port 160 (indicated by phantom circle). The base 130 is partially covered by a mounting label 170 that can be, for example, a double-sided adhesive film that includes an adhesive carrier with adhesive disposed on both sides. The mounting label 170 seals the fill port 160, while allowing the breather port 180 to maintain fluid communication with the external environment. The mounting label 170 further comprises a release liner 174 that protects the second adhesive surface from environmental exposure. The release liner 174 can be removed, thereby exposing the second adhesive surface that can then be use to secure the filter assembly 110 to an internal surface of an electronic enclosure. It will be appreciated that although the fill port 160 and breather port 180 are depicted as generally circular, they can be of any shape.

Figure 13:
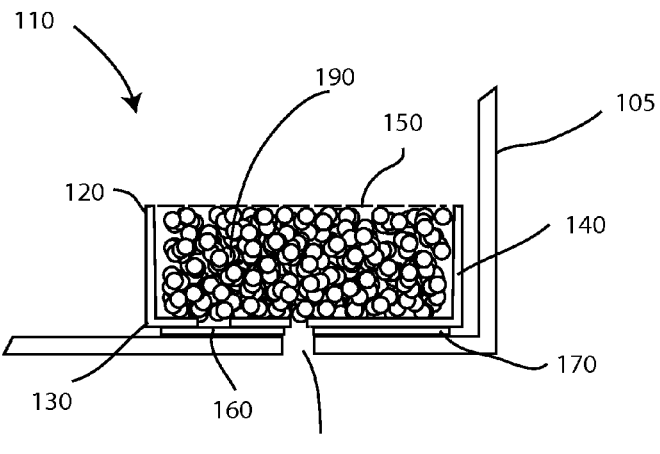
FIG. 13 shows the housing for a filter assembly of FIGS. 6-12, wherein the filter assembly has been mounted within an electronic enclosure.

FIG. 13 portrays the filter assembly of FIGS. 6-12 where the filter assembly is mounted within an electronic enclosure. The filter assembly 110 is secured within the electronic enclosure 105 via the mounting label 170. The release liner 174 of FIG. 12B had been removed, exposing the second adhesive surface, and said surface is used to secure the filter assembly 110 to the electronic enclosure 105. The filter assembly 110 is in fluid communication with the external environment via the breather port 180. It will be appreciated that that contaminant control media 190 is of a sufficient size, shape, or composition that it is unable to escape via the breather port 180. In this embodiment of the invention, the filter assembly 110 serves as an adsorbent breather filter.

Figure 14A:
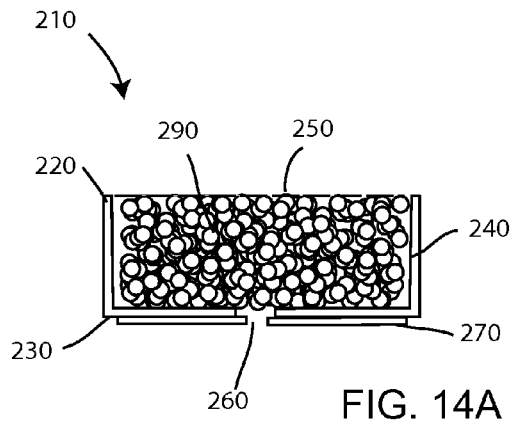
FIG. 14A shows an alternative filter assembly of the invention, wherein the fill hole is configured for use as a breather hole.

FIG. 14A portrays a schematic cross sectional view of another embodiment of the invention where the fill port is configured for use as the breather port. Thus, the fill port is initially used to fill the housing with contaminant control media, after which the port's diameter is typically reduced to prevent escape of the contaminant control media, but to still allow the fill port to function as a breather port. In alternative to reducing the diameter of the fill port, it is possible to place a porous media or scrim over the fill port to retain contaminant control media. The internal cavity of the housing 240 of the filter assembly 210 contains the contaminant control media 290. The contaminant control media 290 is loaded into the internal cavity of the housing 240 via the fill port 260 found on the base 230 of the filter assembly 210. The housing 240 further comprises a top 220 to which filter media 250 is secured. In this embodiment of the invention, a mounting label 270 is affixed to the base 230 to decrease the diameter of the fill port 260.

The diameter of the fill port 260 should be decreased so that 1) the fill port 260 can be configured into the breather port and 2) the contaminant control media 290 does not escape through the fill port 260. It will be appreciated that that contaminant control media 290 is of a sufficient size, shape, or composition, that it is unable to escape via the breather port. The mounting label 270 can be, for example, a double-sided adhesive film that includes an adhesive carrier with adhesive disposed on both sides. The mounting label 270 will further allow the filter assembly 210 to be secured within an electronic enclosure.

Figure 14B:
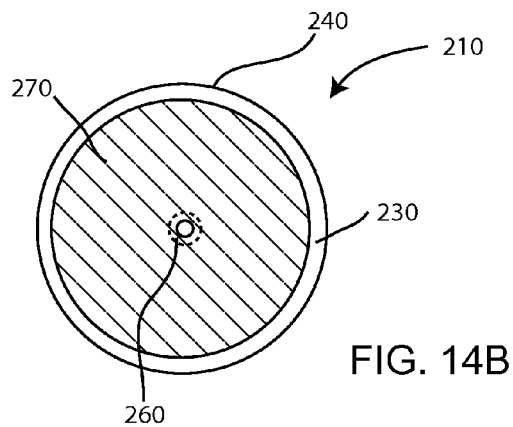
FIG. 14B shows a bottom plan view of the filter assembly of FIG. 14A.

FIG. 14B portrays a bottom plan view of the filter assembly of FIG. 14A. The base 230 of the filter assembly 210 defines a fill port 260 (indicated by phantom circle). Initially, the fill port 260 is used to fill the internal cavity of the housing 240 with contaminant control media 290; later the fill port 260 is configured into the breather port (indicated by the intact circle within the phantom circle that defined the fill port 260) by the addition of the mounting label 270. The mounting label 270 sufficiently decreases the size of the fill port 260 so that the contaminant control media 290 cannot escape. Additionally, the mounting label 270 will allow the filter assembly 210 to be secured within an electronic enclosure. It will be appreciated that although the fill port 260 and breather port are depicted as generally circular, they can be of any shape. In this embodiment of the invention, the filter assembly 210 serves as an adsorbent breather filter.

Figure 15A:
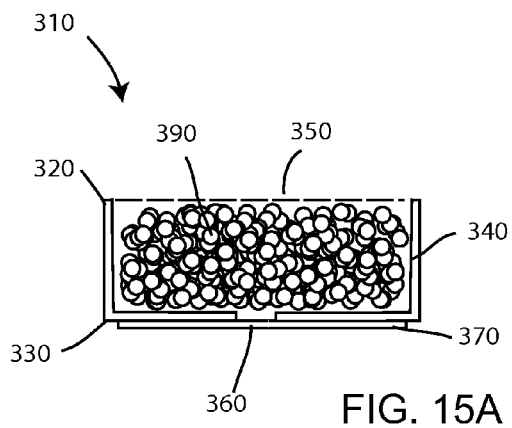
FIG. 15A shows an alternative filter assembly, wherein the fill hole is sealed completely and the filter does not include a breather hole.

FIG. 15A portrays another embodiment of the invention where the fill port is completely sealed and there is no breather port. The internal cavity of the housing 340 of the filter assembly 310 contains the contaminant control media 390. The contaminant control media 390 was loaded into the internal cavity of the housing 340 via the fill port 360 found on the base 330 of the filter assembly 310. The housing 340 further comprises a top 320 to which filter media 350 is secured. The base 330 is partially covered by a mounting label 370 that can be, for example, a double-sided adhesive film that includes an adhesive carrier with adhesive disposed on both sides. The mounting label 370 seals the fill port 360 after the contaminant control media 390 has been loaded into the internal cavity of the housing 340. The mounting label 370 can further comprise a release liner that protects the second adhesive surface from environmental exposure. The release liner can be removed, thereby exposing the second adhesive surface, and the entire filter assembly 310 can be secured to an internal surface of an electronic enclosure. The assembly of FIG. 15A is particularly useful as an adsorbent assembly within an electronic enclosure.

Figure 15B:
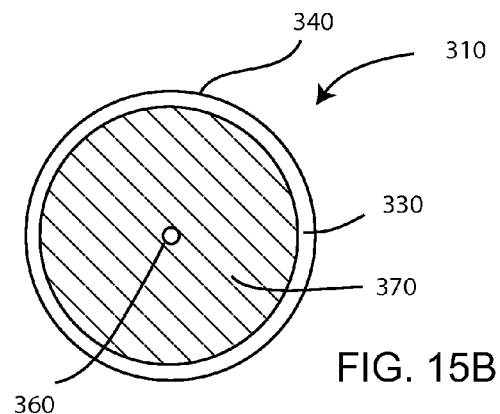
FIG. 15B shows a bottom plan view of the filter assembly of FIG. 15A.

FIG. 15B portrays a bottom plan view of the filter assembly of FIG. 15A. The base 330 of the filter assembly 310 defines a fill port 360 (indicated by phantom circle). This fill port 360 is used to fill the internal cavity of the housing 340 with contaminant control media 390. The mounting label 370 is affixed to the base 330 of the filter assembly 310 to seal the fill port 360. This embodiment of the invention lacks a breather port and therefore can be used as an adsorbent filter.

Figure 16A:
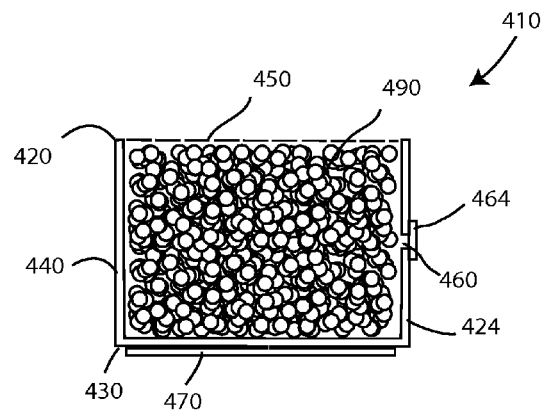
FIG. 16A shows an alternative filter assembly of the invention, wherein the fill hole is positioned along the side of the filter assembly.

FIG. 16A portrays another embodiment of the filter assembly where the fill port is positioned on a side wall of the filter assembly. The internal cavity of the housing 440 of the filter assembly 410 contains the contaminant control media 490. The contaminant control media 490 was loaded into the internal cavity of the housing 440 via the fill port 460 found on the sidewall 424 of the filter assembly 410. The housing 440 further comprises a top 420 to which filter media 450 is secured.

The base 430 is partially covered by a mounting label 470 that can be, for example, a double-sided adhesive film that includes an adhesive carrier with adhesive disposed on both sides. The mounting label 470 is used to secure the filter assembly 410 to a mounting surface, such as the interior surface of an electronic enclosure. The fill port 460 can be sealed with an adhesive label 464 and can be, for example, a single sided adhesive film that includes an adhesive carrier with adhesive disposed on a single side. In an alternative embodiment, the fill port 460 can be designed so that it can be sealed with tight fitting plug.

Figure 16B:
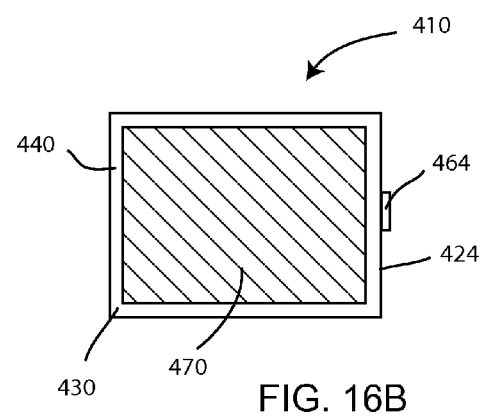
FIG. 16B shows a bottom plan view of the filter assembly of FIG. 16A.

FIG. 16B portrays a bottom plan view of the filter assembly of FIG. 16A. To the base 430 of the housing 440 of the filter assembly 410 is affixed a mounting label 470. The mounting label 470 can further comprise a release liner that protects the second adhesive surface from environmental exposure. The release liner can be removed, thereby exposing the second adhesive surface, and the entire filter assembly 410 can be secured to an internal surface of an electronic enclosure. On the sidewall 424 of the housing 440 is the fill port 460 of FIG. 16A that can be sealed with an adhesive label 464. It will be appreciated that although the filter assembly 410 in this embodiment is cubical in shape, the filter assembly 410 can be of any shape. This embodiment of the invention lacks a breather port and therefore can be used as an adsorbent filter.

Figure 17A:
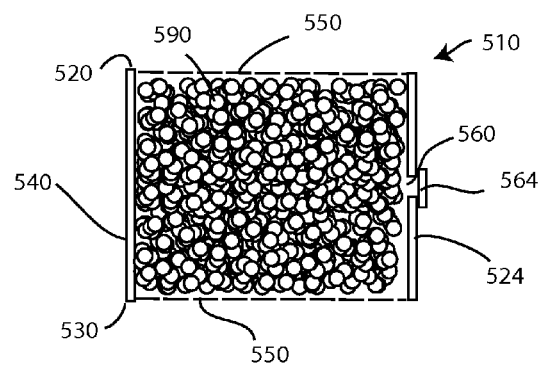
FIG. 17A shows an alternative filter assembly of the invention, wherein filter media is placed on two sides of the filter assembly.

FIG. 17A portrays another embodiment of the invention where filter media is secured to two dimensions of the filter assembly. The internal cavity of the housing 540 of the filter assembly 510 contains the contaminant control media 590. The contaminant control media 590 was loaded into the internal cavity of the housing 540 via the fill port 560 found on the sidewall 524 of the filter assembly 510. The housing 540 further comprises a top 520 and base 530 to which filter media 550 is secured. It will be appreciated that the filter media 550 can be secured with a variety of methods including, but not limited to, mold casting, welding, adhesives, mechanical connections, and the like. It will be further appreciated that the filter assembly 510 can be held in the electronic enclosure by mechanical techniques, including, but not limited to, clips, frames, welding, or the like. The fill port 560 can be sealed with an adhesive label 564 that can be, for example, a single sided adhesive film that includes an adhesive carrier with adhesive disposed on a single side. In an alternative embodiment, the fill port 560 can be designed so that it can be sealed with tight fitting plug.

Figure 17B:
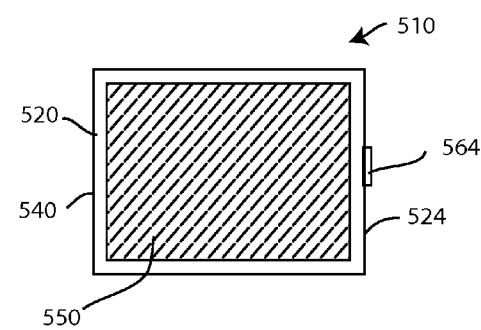
FIG. 17B shows a top plan view of the filter assembly of FIG. 17A.

FIG. 17B portrays a top plan view of the filter assembly of FIG. 17A. The top 520 of the housing 540 of the filter assembly 510 partially comprises secured filter media 550. The fill port 560 of FIG. 17A located on sidewall 424 is sealed with an adhesive label 464. It will be appreciated that although the filter assembly 510 in this embodiment is cubical in shape, the filter assembly 410 can be of any shape. This embodiment of the invention lacks a breather port and therefore can be used as an adsorbent filter.

Figure 18A:
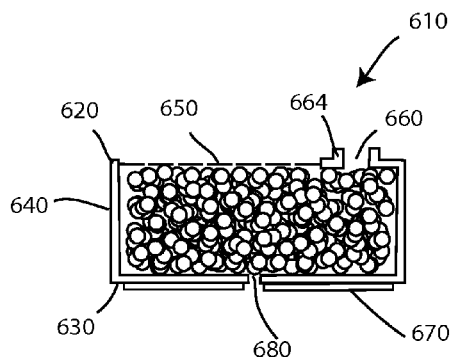
FIG. 18A shows an alternative filter assembly of the invention, wherein the filter media and fill port are positioned on the same surface of the filter assembly.

FIG. 18A portrays another embodiment of the invention where the secured filter media and the fill port are located on the same surface of the filter assembly. The internal cavity of the housing 640 of the filter assembly 610 contains the contaminant control media 690. The contaminant control media 690 was loaded into the internal cavity of the housing 640 via the fill port 660 found on the same surface upon which the secured filter media 650 is positioned. The fill port 660, in FIG. 18A, is shown "unsealed". A weld horn, in conjunction with ultrasonic welding, can be used on the protrusions 664 of the fill port 660 to seal the filter assembly 610. The housing 640 further comprises a top 620 to which filter media 650 is secured and a base 630 that defines a breather port 680. The breather port is further defined by a mounting label 670. The base 630 is partially covered by a mounting label 670 that can be, for example, a double-sided adhesive film that includes an adhesive carrier with adhesive disposed on both sides. The mounting label 670 is used to secure the filter assembly 610 to a mounting surface, such as the interior surface of an electronic enclosure.

Figure 18B:
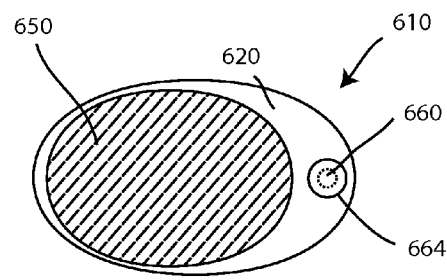
FIG. 18B shows a top plan view of the filter assembly of FIG. 18A.

FIG. 18B portrays a top plan view of the filter assembly of FIG. 18A. The top 620 of the housing 640 of the filter assembly 610 partially comprises secured filter media 650. The fill port 660 of FIG. 18A located on the top 620 and has been sealed with a weld horn in conjunction with ultrasonic welding. It will be appreciated that although the filter assembly 610 in this embodiment is generally oval in shape, the filter assembly 610 can be of any shape. This embodiment of the invention can be used as a breather adsorbent filter.

Figure 19A:
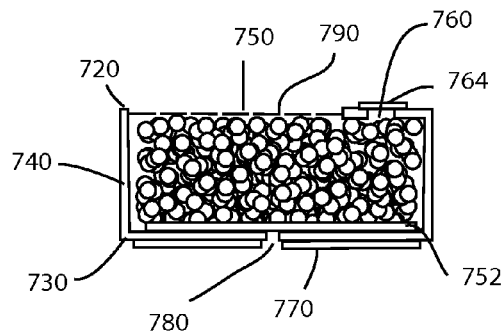
FIG. 19A shows an alternative filter assembly of the invention, wherein the filter media and fill port are positioned on the same surface of the filter assembly, further comprising a scrim over the breather port.

FIG. 19A portrays another embodiment of the invention where the secured filter media and the fill port are located on the same surface of the filter assembly and a scrim that covers the breather port is located within the internal cavity of the housing. The internal cavity of the housing 740 of the filter assembly 710 contains the contaminant control media 790. The contaminant control media 790 was loaded into the internal cavity of the housing 740 via the fill port 760 found on the same surface upon which the secured filter media 750 is positioned. The fill port 760 can be sealed with an adhesive label 764 that can be, for example, a single sided adhesive film that includes an adhesive carrier with adhesive disposed on a single side.

In an alternative embodiment, the fill port 760 can be designed so that it can be sealed with tight fitting plug. The housing 740 further comprises a top 720 to which filter media 750 is secured and a base 730 that defines a breather port 780. The breather port is further defined by a mounting label 770. The base 730 is partially covered by a mounting label 770 that can be, for example, a double-sided adhesive film that includes an adhesive carrier with adhesive disposed on both sides. The mounting label 770 is used to secure the filter assembly 710 to a mounting surface, such as the interior surface of an electronic enclosure. Within the housing 740, adjacent to the base 730, and above the breather port 780, is placed a scrim 752. This scrim 752 can be composed of similar material as the filter media 750 and the scrim 752 can function to filter the incoming fluid or prevent the contaminant control media 790 from escaping through the breather port 780.

Figure 19B:
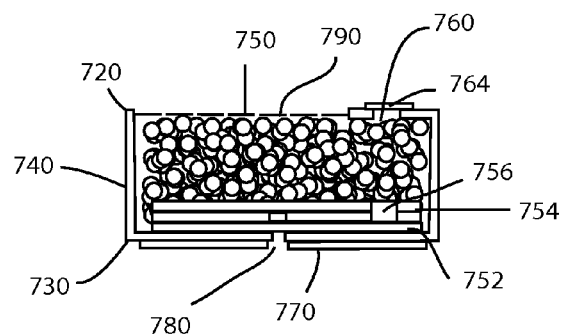
FIG. 19B shows a side cross sectional view of a filter assembly including a diffusion channel.

In the embodiment portrayed in FIG. 19B, the scrim 752 defines a diffusion channel 756 and a breather port 780. The diffusion channel 756 provides a tortuous or extended path that can be used to restrict contaminant entry into the electronic enclosure. The diffusion channel 756 can be formed as a straight or curved path. Alternatively, the diffusion channel 756 may be formed to have a more complex path, such as a winding path or a spiral path. For example, the diffusion channel can be configured as an inwardly spiraling channel, an outwardly spiraling channel, or as a maze-like configuration. The diffusion channel 756 can, in some embodiments, have two or more branches.

Examples of diffusion channels for use with computer disk drive systems are described in U.S. Pat. No. 4,863,499, incorporated herein by reference. Other examples of a diffusion channels defined by diffusion channel layer of film are described in U.S. Pat. No. 5,997,614, incorporated herein by reference. Fluid enters the breather port 780, travels through diffusion channel 756, and then enters the internal cavity of the filter housing 740. Fluid can also travel through this pathway in the reverse direction depending on relative air pressure.

Referring again to FIG. 19B, the base 730 includes a scrim 752. The scrim 752 defines the diffusion channel 756. The boundary layer 754 can be formed using a polymer or metallic film or a plastic layer. The boundary layer 754 is typically nonporous and has a low permeability to the fluid to be filtered, particularly at the fluid pressures expected for operation of the filter assembly 710. Examples of suitable polymer films for use in the boundary layer 754 include polyester (e.g., Mylar), polyethylene, polypropylene, nylon, polycarbonate, polyvinyl chloride, and polyvinyl acetate films. Preferably, the polymer films have relatively low or no out-gassing. Suitable metallic films for use in the diffusion boundary layer 754 include films formed using metals, such as, for example, copper and aluminum, and alloys, such as, for example, stainless steel. Preferred metal films do not significantly corrode or form reaction products (e.g., rust) that can be dislodged from the film under the expected operating conditions of the filter. In some embodiments, the metallic film may be deposited or otherwise formed on a base material, such as, for example, a polymer film.

Figure 19C:
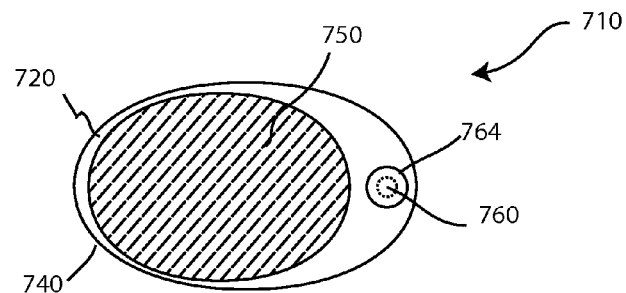
FIG. 19C shows a top plan view of the filter assembly of FIG. 19A.

FIG. 19C portrays a top plan view of the filter assemblies of FIGS. 19A and 19B. The top 720 of the housing 740 of the filter assembly 710 partially comprises secured filter media 750. The fill port 760 can be sealed with an adhesive label 764 that can be, for example, a single sided adhesive film that includes an adhesive carrier with adhesive disposed on a single side. In an alternative embodiment, the fill port 760 can be designed so that it can be sealed with tight fitting plug. It will be appreciated that although the filter assembly 710 in this embodiment is generally oval in shape, the filter assembly 710 can be of any shape. This embodiment of the invention can be used as a breather adsorbent filter.

Figure 20:
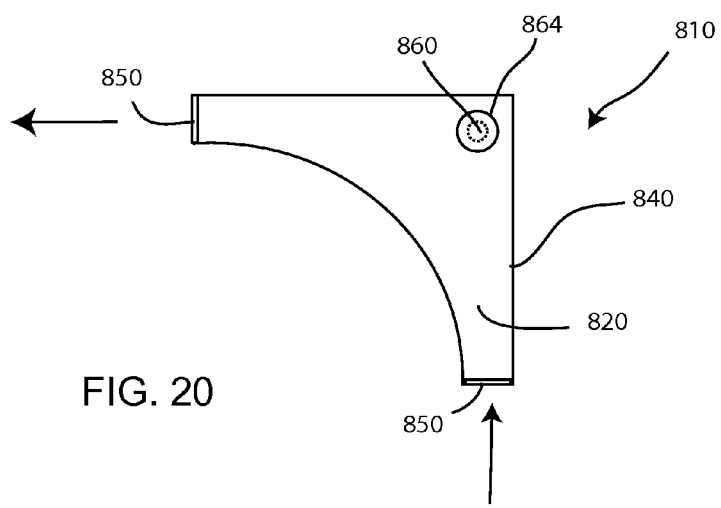
FIG. 20 shows a top plan view of an alternative filter assembly.

FIG. 20 portrays a top plan view of another embodiment of the invention. Arrows show fluid entering the filter assembly 810 through one secured filter media 850 and exiting the filter assembly 810 housing 840 through a second secured filter media 850. The housing 840 further defines a top 820 upon which a fill port 860 is located; the fill port 860 being used to deposit contaminant control media within the internal cavity of the housing 840. In alternative embodiments, the fill port 860 can be located on the base or the sidewall of the housing 840. The fill port 860 can be sealed with an adhesive label 864 that can be, for example, a single sided adhesive film that includes an adhesive carrier with adhesive disposed on a single side. In an alternative embodiment, the fill port 860 can be designed so that it can be sealed with tight fitting plug. In this embodiment, the invention can be used as a recirculation filter.

In an alternative embodiment of FIG. 20, the invention further comprises a base that can define a breather port that is in fluid communication with both the internal cavity of the housing of the filter assembly and the external environment. In this embodiment, the invention can be used as a breather recirculation filter. In an alternative embodiment of FIG. 20, the invention further comprises a breather port and diffusion channel. In this embodiment, the invention can be used as a breather recirculation filter.

Contaminant Control Material

Typically, the contaminant control media is disposed within the internal cavity of the housing or within a porous or non-porous encapsulated space. The contaminant material can be any suitable material for the removal, reduction, entrapment, immobilization, adsorption, absorption, and neutralization of contaminants.

The contaminant control media is typically provided for the removal of chemical contaminants. The contaminant control media can remove contaminants from the air entering the enclosure atmosphere or already present within the enclosure atmosphere by adsorption, neutralization, or immobilization. As used throughout this application, the terms "adsorb," "adsorption," "adsorbent" and the like, are intended to also include the mechanism of absorption. Typically, the contaminant control media is selected to be stable and adsorb or neutralize contaminants within normal disk drive operating temperatures, for example, within a range of about −40° C. to 100° C.

The contaminant control media adsorbs or neutralizes one or more types of contaminants, including, for example, water, water vapor, acid gas, and volatile organic compounds. The contaminant control media can include adsorbent material (physisorbent or chemisorbent material), such as, for example, a desiccant (i.e., a material that adsorbs or absorbs water or water vapor) or a material that adsorbs or absorbs volatile organic compounds, acid gas, or both. Suitable adsorbent materials include, for example, activated carbon, activated alumina, molecular sieves, silica gels, potassium permanganate, calcium carbonate, potassium carbonate, sodium carbonate, calcium sulfate, or mixtures thereof. Carbon is suitable for most implementations, and carbon suitable for use with the present invention is disclosed in U.S. Pat. No. 6,077,335, incorporated herein by reference in its entirety.

Additionally, contaminant control media can include neutralization material. Neutralization material can include acid or base impregnated substances that can effectively neutralize the gaseous contaminants found within the housing or electronic enclosure. Neutralization material can also include enzyme or catalyst impregnated substances that increase the rate of degradation of the gaseous contaminants found with the housing or electronic enclosure.

Although contaminant control media can be manufactured from a single substance, mixtures of materials are also useful, for example, silica gel can be blended with carbon particles. In some embodiments, the contaminant control media includes layers or combinations of materials, so that different contaminants are selectively removed as they pass through or by the different materials.

It will be appreciated that, contaminant control media can undertake many forms including powdered (passes through 100 mesh), granular (passes through 28 to 200 mesh), beads, slurry, paste and any combination thereof.

Filter Media

Filter media of the present invention may contain one or more particulate filter layers to prevent particulate contaminants from entering the electronic enclosure from the filter assembly. Such particulate contaminants may originate outside of the electronic enclosure or may be shed from the contaminant control media. Filters of the present invention may also include particulate filter layers to prevent particulate contaminants from entering the filter assembly from outside of the electronic enclosure. They may be disposed on the outside of the filter assembly or disposed inside of the filter assembly.

The filter media may comprise a variety of porous or microporous membranes. The size of the pores in the membranes and the thickness of the membranes often determine, at least in part, the size of particles allowed through the membrane and filter.

Often the porous or microporous membranes are formed from polymers. Examples of suitable porous or microporous membranes include porous or microporous polyethylene, polypropylene, nylon, polycarbonate, polyester, polyvinyl chloride, polytetrafluoroethylene (PTFE), and other polymeric membranes. An especially suitable filtering layer is expanded polytetrafluoroethylene (ePTFE) because of its good filtration performance, conformability to cover adsorbent layers, and cleanliness. A preferred ePTFE membrane has a filtration efficiency of 99.99% at 0.1 micrometer diameter sized particles with a resistance to airflow of approximately 20 mm water column at an airflow of 10.5 feet per minute face velocity. ePTFE is commercially available under the registered trademark GORE-TEX by W. L. Gore & Associates, Inc.

In one embodiment, the filter assembly is shown with a porous support layer disposed within the internal cavity of the filter housing. The contaminant control media is disposed on the porous support layer. For example, a mesh or scrim can be used as the porous support layer to hold the contaminant control media. Polyester and other suitable materials (such as polypropylene, polyethylene, nylon and PTFE) can be used as the mesh or scrim. The porous support layer can be used as a base on which the adsorbent media is disposed.

Typically, any porous support layer is not more than about 40% of the weight of the adsorbent material, and is generally about 10 to 20% of the total filter media weight.

Filter Housing

The filter housing may be, for example, an outer covering, a casing, or a shell. The housing is typically formed from a plastic material, such as, for example, polycarbonate, polyvinyl chloride, nylon, polyethylene, polypropylene, or polyethylene terephthalate. The housing may be a single piece or, alternatively, the housing may be formed as two or more pieces that are combined together using, for example, an adhesive, mechanical connectors, heat sealing, and ultrasonic welding to form, for example, a perimeter seal.

It should be noted that in the context of this invention the reference to the "reduction" or "removal" of contaminants refers to the clarification of a fluid (e.g., gas or liquid) being filtered. The fluid being clarified in a hard disk drive enclosure is typically an air stream. It should be appreciated, however, that streams of other gases or liquids could also be clarified by the filter construction of the present invention. The reduction or removal of contaminants from a liquid or gas stream by a filter construction can also be referred to as entrapment, immobilization, adsorption, absorption, neutralization, or otherwise binding (e.g., by covalent, ionic, coordinative, hydrogen, or Van der Waals bonds, or combinations thereof) of the contaminants inside or on the surface of the filter construction.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

I claim:

1. A method for filling a porous filter assembly with a contaminant control media, comprising the steps of:
   a) providing a porous container defining an internal cavity, wherein the porous container is at least partially formed of filter media, and wherein the porous container includes at least one fill port in communication with the internal cavity of the container;
   b) providing contaminant control media;
   c) drawing a partial vacuum across the porous container; and
   d) drawing the contaminant control media into the internal cavity of the porous container under partial vacuum, and
   e) sealing the fill port after drawing the contaminant control media into the internal cavity of the porous container.

2. The method of claim 1, wherein the partial vacuum within the porous container is created by drawing a partial vacuum to the outside of the filter media.

3. The method of claim 1, wherein the filter media comprises ePTFE.

4. The method of claim 1, wherein the contaminant control media comprises an adsorbent material that includes activated carbon, silica gel, and or combinations thereof.

5. The method of claim 4, wherein the adsorbent material is selected from the group including powdered adsorbent, granular adsorbent, beads, slurry, paste and combinations thereof.

6. The method of claim 1, wherein the contaminant control media includes a neutralization material that comprises an immobilized acid, base, enzyme, catalyst, and or combinations thereof.

7. The method of claim 1, wherein the porous container comprises a filter bag.

8. The method of claim 1, wherein the porous container comprises molded housing.

9. The method of claim 1, wherein the filter assembly is configured for insertion into an electronic enclosure.

10. A filter assembly for use in an electronic enclosure, the filter assembly comprising:
   a) a housing comprising:
      (i) an internal cavity defined by a first surface, a second surface and one or more sidewalls connecting the first and second surfaces, the internal cavity configured to receive a contaminant control media,
      (ii) at least one fill port in communication with the internal cavity, wherein the fill port is sized such that the contaminant control media is able to pass through the fill port when it is not sealed,
      (iii) at least one breather port in communication with the internal cavity, wherein the contaminant control media is of sufficient size, shape or composition that it is unable to pass through the breather port,
      (iv) filter media at least partially covering at least one opening of the housing; and
   b) contaminant control media within the internal cavity.

11. The filter of claim 10, wherein at least one of the first surface, the second surface or one or more sidewalls of the housing is composed partially of a non-porous surface.

12. The filter of claim 10, wherein the fill port passes completely through the non-porous surface.

13. The filter of claim 10, wherein the fill port is sealed with an adhesive label.

14. The filter of claim 10, wherein the fill port is sealed with a snug fit plug.

15. The filter of claim 10, wherein the fill port is sealed with filter media.

16. The filter of claim 10, wherein the fill port is sealed with a weld horn in conjunction with an ultrasonic welder.

17. The filter of claim 10, wherein the filter media comprises ePTFE.

18. The filter of claim 10, wherein the contaminant control media is an adsorbent material that comprises activated carbon, silica gel, or combinations thereof.

19. The filter of claim 10, wherein the contaminant control media is selected from the group including powdered adsorbent, granular adsorbent, beads, slurry, paste and combinations thereof.

20. The filter of claim 19, wherein the contaminant control media include a neutralization material that comprises an immobilized acid, base, enzyme, catalyst, or combination thereof.

\* \* \* \* \*